(12) United States Patent
Ishii

(10) Patent No.: US 9,288,456 B2
(45) Date of Patent: Mar. 15, 2016

(54) IMAGE PROCESSING APPARATUS AND METHOD

(71) Applicant: CANON KABUSHIKI KAISHA, Tokyo (JP)

(72) Inventor: Toshiyuki Ishii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 13/939,546

(22) Filed: Jul. 11, 2013

(65) Prior Publication Data

US 2014/0055645 A1     Feb. 27, 2014

(30) Foreign Application Priority Data

Aug. 21, 2012 (JP) ................. 2012-182640

(51) Int. Cl.
| | |
|---|---|
| H04N 9/64 | (2006.01) |
| H04N 9/68 | (2006.01) |
| H04N 9/73 | (2006.01) |
| H04N 1/60 | (2006.01) |

(52) U.S. Cl.
CPC ............. *H04N 9/646* (2013.01); *H04N 1/6086* (2013.01); *H04N 1/6088* (2013.01); *H04N 9/68* (2013.01); *H04N 9/73* (2013.01)

(58) Field of Classification Search
CPC ... H04N 1/6086; H04N 1/6088; H04N 9/646; H04N 9/68; H04N 9/73
See application file for complete search history.

(56) References Cited

U.S. PATENT DOCUMENTS

| 5,293,242 A * | 3/1994 | Mamiya .................. 348/362 |
| 7,018,050 B2 * | 3/2006 | Ulichney et al. ............. 353/69 |
| 7,551,797 B2 * | 6/2009 | Dorrell et al. .............. 382/274 |
| 2005/0046883 A1 * | 3/2005 | Chiba .................... 358/1.9 |
| 2005/0103976 A1 * | 5/2005 | Ioka et al. ............... 250/208.1 |
| 2006/0050335 A1 * | 3/2006 | Dorrell et al. ............ 358/516 |
| 2008/0303913 A1 * | 12/2008 | Mertens ................ 348/222.1 |
| 2009/0201391 A1 * | 8/2009 | Ishii ..................... 348/234 |
| 2010/0134659 A1 * | 6/2010 | Chammings ............. 348/235 |
| 2011/0134262 A1 * | 6/2011 | Ogasahara .............. 348/222.1 |

FOREIGN PATENT DOCUMENTS

| JP | 2005-079834 A | 3/2005 |
| JP | 2011-124884 A | 6/2011 |

* cited by examiner

*Primary Examiner* — Amy Hsu
(74) *Attorney, Agent, or Firm* — Fitzpatrick, Cella, Harper & Scinto

(57) ABSTRACT

First image data obtained by capturing an image of a subject under a first light condition, and second image data obtained by capturing an image of the subject under a second light condition different from the first light condition are input. The sampling positions of colors used to generate correction parameters are acquired. First color signal values are sampled from the sampling positions in the first image data, and second color signal values are sampled from the sampling positions in the second image data. Correction parameters used to correct the first image data which depends on the first light condition into image data which depends on the second light condition are generated based on the first and second color signal values.

11 Claims, 13 Drawing Sheets

IMAGE PROCESSING APPARATUS AND METHOD

BACKGROUND OF THE INVENTION

1. Field of the Invention

The present invention relates to image processing in which the difference between illuminants in capturing an image is corrected.

2. Description of the Related Art

To transform the colors of an image captured under an illuminant different from a observation light (viewing illuminant) into colors equivalent to those of an image captured under the observation light, it is necessary to perform color correction processing in which color data under the shooting light is transformed into that under the observation light.

A technique of calculating color correction conditions for color transformation has been proposed, although it does not correct the difference between illuminants. With this technique, a color transformation matrix for matching RGB signal values obtained by capturing a color chart with those of target colors obtained from the colorimetric values of the color chart is obtained using the least-squares method.

Upon practical application of the above-mentioned technique, the RGB signal values of representative colors can be sampled from an image captured under an illuminant different from a observation light, and that captured under the observation light to generate color correction conditions.

Also, ununiformity (to be referred to as "ununiformity of light" hereinafter) occurs in the captured image data due to factors associated with, for example, the arrangement of illuminants in capturing an image. When representative colors are sampled from the image data suffering from ununiformity of light to calculate color correction conditions, the color correction accuracy degrades. Therefore, a technique of eliminating ununiformity of light in calculating color correction conditions for correcting the difference between illuminants has also been proposed.

However, in calculating color correction conditions for correcting the difference between illuminants, the color reproducibility and tonality of image data after light-source conversion processing (illuminant transformation processing) may degrade when the colors of an image (to be referred to as a "shooting light image" hereinafter) captured under a shooting light (capturing illuminant) are associated with those of an image (to be referred to as a "observation light image" hereinafter) captured under a observation light using one correction parameter. Especially when, for example, the ununiformity of light of the image is large, or the colors of the image are locally distributed in a specific region, the color reproducibility and tonality of image data after light-source conversion processing considerably degrade.

SUMMARY OF THE INVENTION

In one aspect, an image processing apparatus comprises: an input unit configured to input first image data obtained by capturing an image of a subject under a first light condition, and second image data obtained by capturing an image of the subject under a second light condition different from the first light condition; an acquisition unit configured to acquire sampling positions of colors used to generate correction parameters; a sampling unit configured to sample first color signal values from the sampling positions in the first image data, and to sample second color signal values from the sampling positions in the second image data; and a generation unit configured to generate correction parameters, used to correct the first image data which depends on the first light condition into image data which depends on the second light condition, based on the first color signal values and the second color signal values, wherein at least one of the input unit, the acquisition unit, the sampling unit, or the generation unit is implemented at least in part by hardware components of the image processing apparatus.

According to the aspect, light-source conversion processing can be performed with higher accuracy by generating correction parameters from images captured under different light conditions.

Further features of the present invention will become apparent from the following description of exemplary embodiments with reference to the attached drawings.

DESCRIPTION OF THE EMBODIMENTS

Light-source conversion processing as image processing according to the present invention will be described below with reference to the accompanying drawings. Note that the following embodiments do not limit the present invention according to the scope of claims, and all combinations of features described in these embodiments are not always indispensable for solving means of the present invention.

First Embodiment

Overview of Light-Source Conversion Processing

To describe this embodiment, a case wherein light-source conversion processing is typically applied to cultural asset reproduction will be explained first. In general, a cultural asset is reproduced by capturing an image using a digital camera, and outputting the captured image using a printer. A reproduction of a cultural asset is required to reproduce colors equivalent to those of an original under an observation light in which the cultural asset is exhibited, so an image is desirably captured under an observation light.

However, since a observation light often has an insufficient illuminance, noise may be generated in an image captured under the observation light using a digital camera. It is therefore necessary to perform light-source conversion processing in which an electronic flash (to be simply referred to as a "flash" hereinafter) is turned on in transforming a captured shooting light image into an image equivalent to a observation light image. Parameters for light-source conversion processing are generated so as to transform a shooting light image into an image equivalent to an observation light image.

Figure 10:
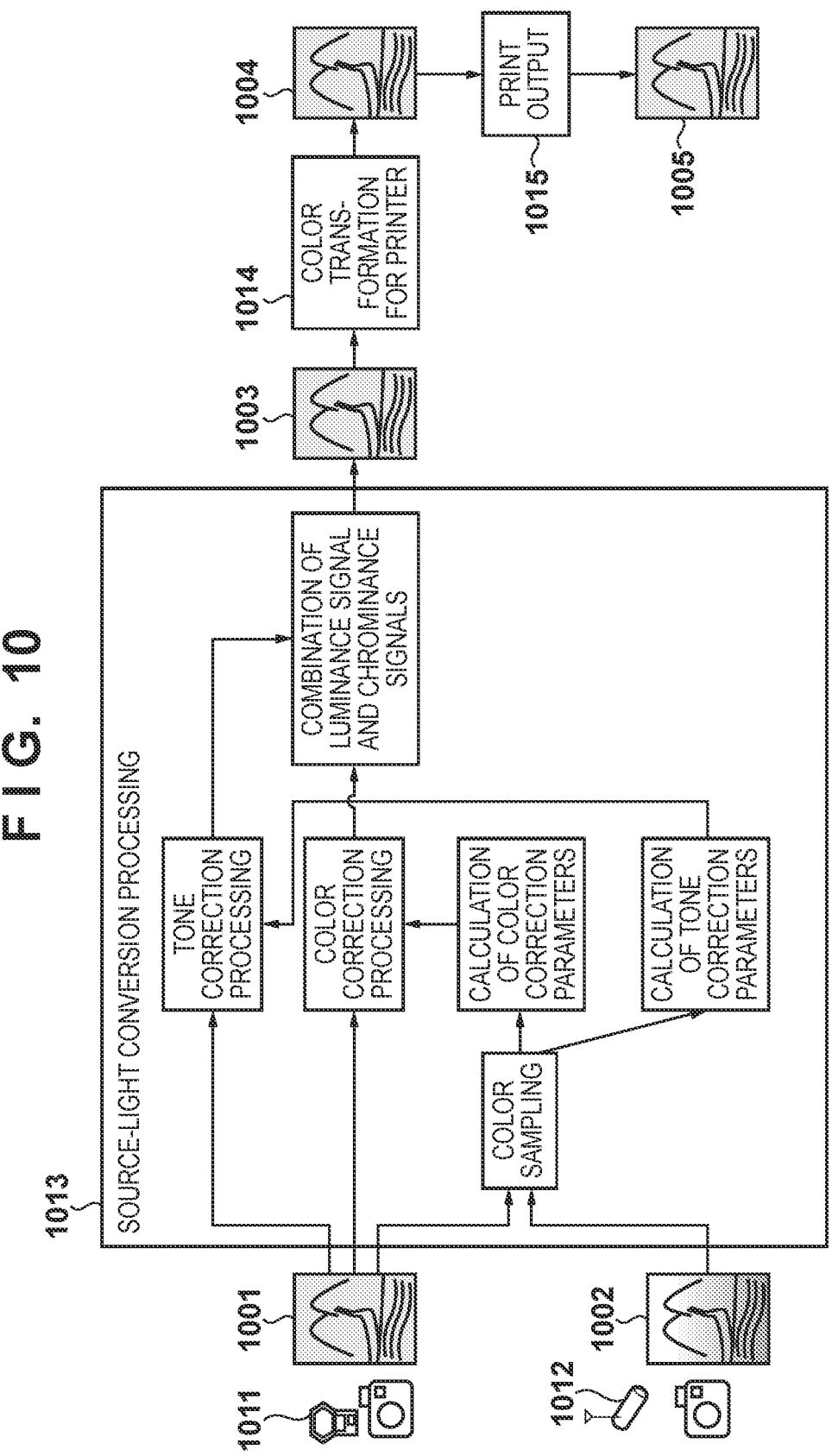
FIG. 10 is a block diagram showing the overview of processing in an application example of image processing according to the present invention.

Note that FIG. 10 shows the overview of processing when image processing in this embodiment is applied to reproduction of a cultural asset or painting. As shown in FIG. 10, in image processing of this embodiment, light-source conversion processing 1013 is performed for a shooting light image 1001, which is obtained by capturing an image of an original of a cultural asset or painting while turning on a flash 1011, to obtain a corrected image 1003 having colors equivalent to those of a observation light image 1002 captured under a observation light 1012 used to actually view a reproduction.

The corrected image 1003 undergoes color transformation 1014 for a printer, and then actually undergoes print output 1015 to obtain a reproduction 1005. The reproduction 1005 is required to reproduce a high-resolution image with little noise, and the same colors as those of an original are required to be reproduced under the observation light 1012 in which an original is placed, thus requiring the light-source conversion processing 1013.

In this embodiment, to perform the light-source conversion processing 1013 with high accuracy, colors at identical positions are sampled from the shooting light image 1001 and observation light image 1002 to generate correction conditions (color correction conditions and tone correction conditions) based on the correspondence of the sampled colors. An image signal of the shooting light image 1001 is combined with a luminance signal having undergone tone correction based on the tone correction conditions, and chrominance signals having undergone color correction based on the color correction conditions to generate a corrected image 1003.

Figure 11B:
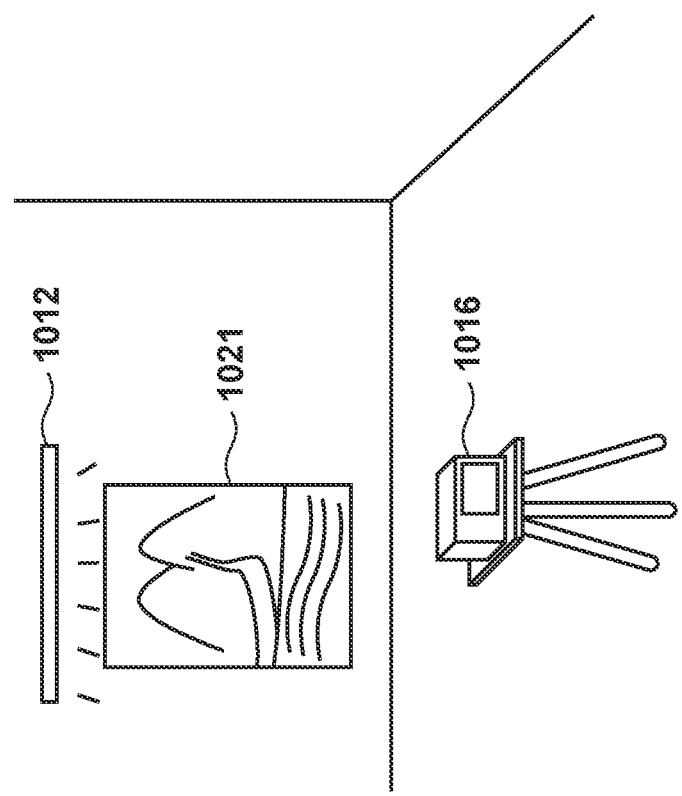
FIGS. 11A and 11B are views for explaining how to capture a shooting light image and an observation light image.
Figure 11A:
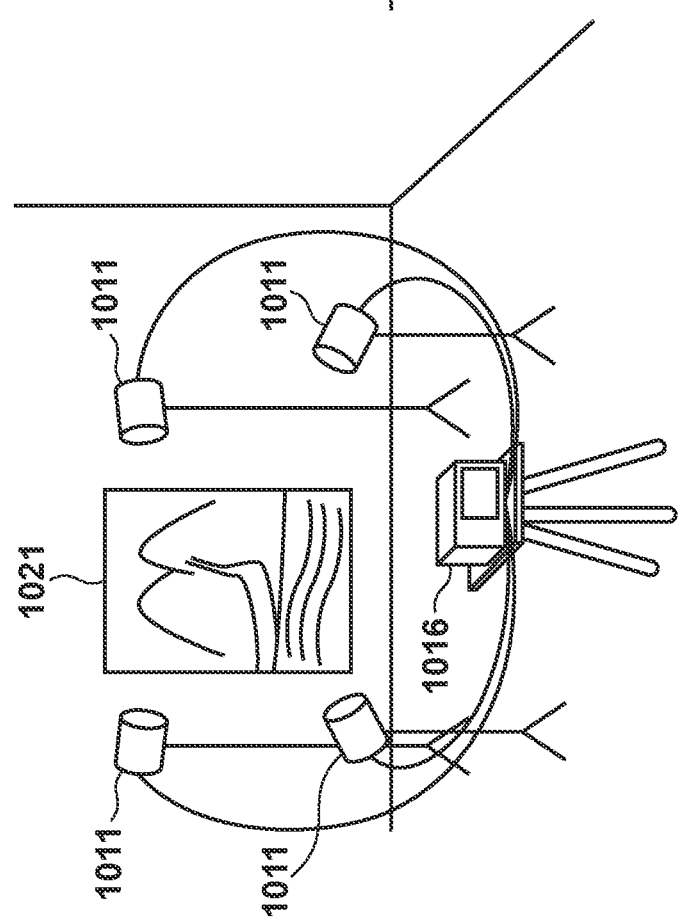

As shown in FIG. 11A, by arranging a plurality of flashes 1011 around an original serving as a subject 1021 to ensure a sufficient amount of light, and capturing an image, a high-resolution shooting light image 1001 is acquired. On the other hand, as shown in FIG. 11B, by capturing an image under the observation light 1012 after the positional relationship between the subject 1021 and a camera 1016 is set to be the same as in capturing the shooting light image 1001, a observation light image 1002 is acquired.

With this arrangement, highly accurate light-source conversion processing 1013 can be performed using correction conditions generated from the shooting light image 1001 and observation light image 1002 to reproduce the same colors as those of the original in the reproduction 1005. This embodiment will be described in detail below.

Configuration of Image Processing Apparatus

Figure 1:
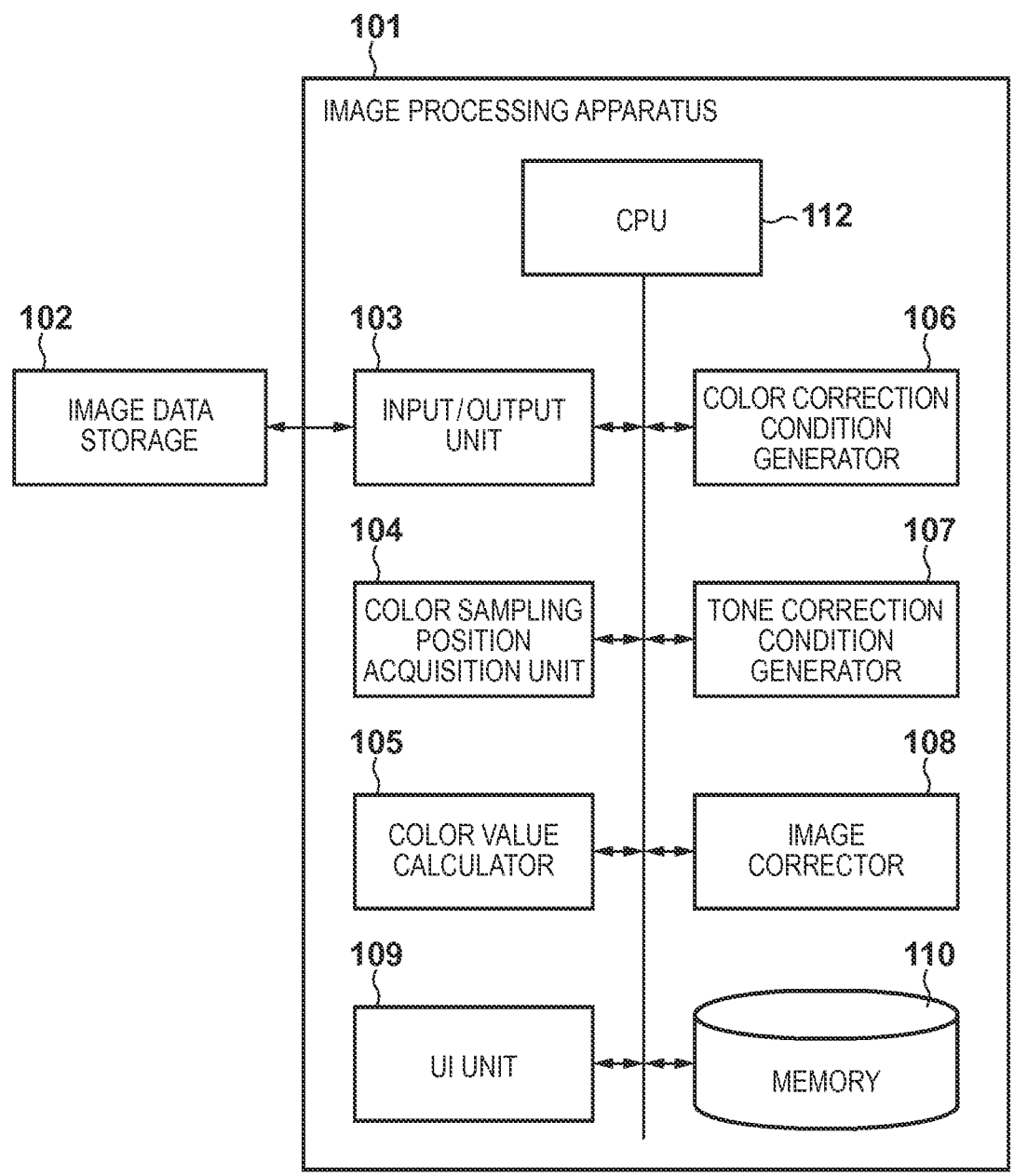
FIG. 1 is a block diagram showing the configuration of an image processing apparatus in the first embodiment.

FIG. 1 is a block diagram showing the configuration of an image processing apparatus 101 in this embodiment.

A central processing unit (CPU) 112 controls the overall apparatus using a memory 110 as a work memory, and executes a program stored in the memory 110 to implement image processing (to be described later). Note that the memory 110 includes nonvolatile memories such as a read only memory (ROM) and hard disk drive (HDD) which store an image processing program and various types of data (to be described later), and a random access memory (RAM) used as a work memory.

The CPU 112 displays, on, for example, a UI unit 109 serving as a touch panel, a user interface (UI) for inputting a user instruction, and controls an input/output unit 103 such as a USB (Universal Serial Bus) interface to input image data of two images, captured under different light conditions (illumination conditions), in accordance with the user instruction from an image data storage 102 such as a memory card. Note that one of the two captured images is the shooting light image 1001, and the other is the observation light image 1002.

A color sampling position acquisition unit 104 acquires sampling positions (to be referred to as "color sampling positions" hereinafter) of the colors of a captured image used to generate correction conditions. A color value calculator 105 calculates color values (to be referred to as "sampled color values" hereinafter) of pixels at the color sampling positions from the image data of the two captured images.

A color correction condition generator 106 generates color correction conditions based on the sampled color values. A tone correction condition generator 107 generates tone correction conditions based on the sampled color values. An image corrector 108 corrects the image data of the shooting light image 1001 to generate image data of the corrected image 1003, using the color correction conditions and tone correction conditions.

The CPU 112 controls the input/output unit 103 to store the image data of the corrected image 1003 in the image data storage 102 in accordance with a user instruction.

Note that the above-mentioned components (color sampling position acquisition unit 104, color value calculator 105, color correction condition generator 106, tone correction condition generator 107, and image corrector 108) are implemented by executing the image processing program by the CPU 112. Alternatively, image processing (to be described later) may be implemented by building the above-mentioned components into the image processing apparatus 101 as hardware, and controlling the operations of these components by the CPU 112.

Light-Source Conversion Processing

Figure 2:
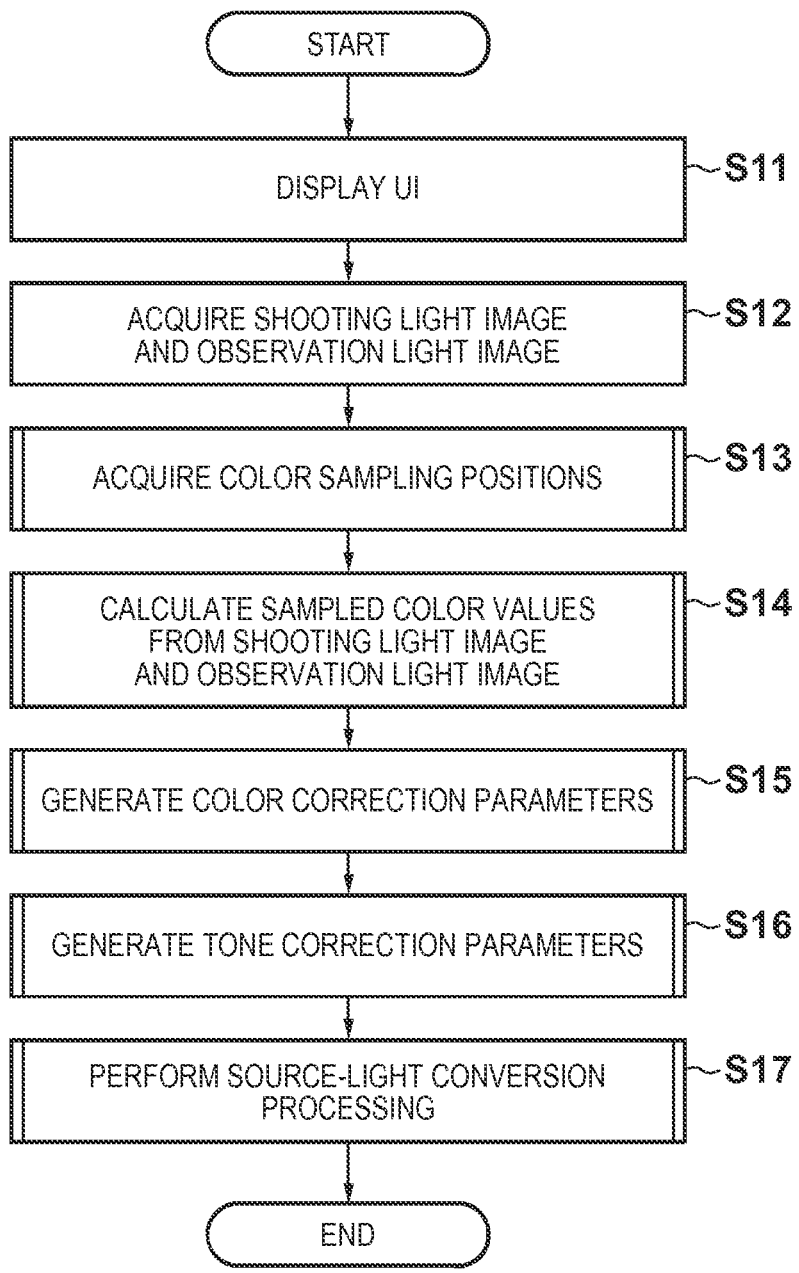
FIG. 2 is a flowchart showing light-source conversion processing.

FIG. 2 is a flowchart showing light-source conversion processing executed by the image processing apparatus 101.

The CPU 112 displays, on the UI unit 109, a UI for inputting a user instruction indicating information required for image processing (S11).

Figure 3:
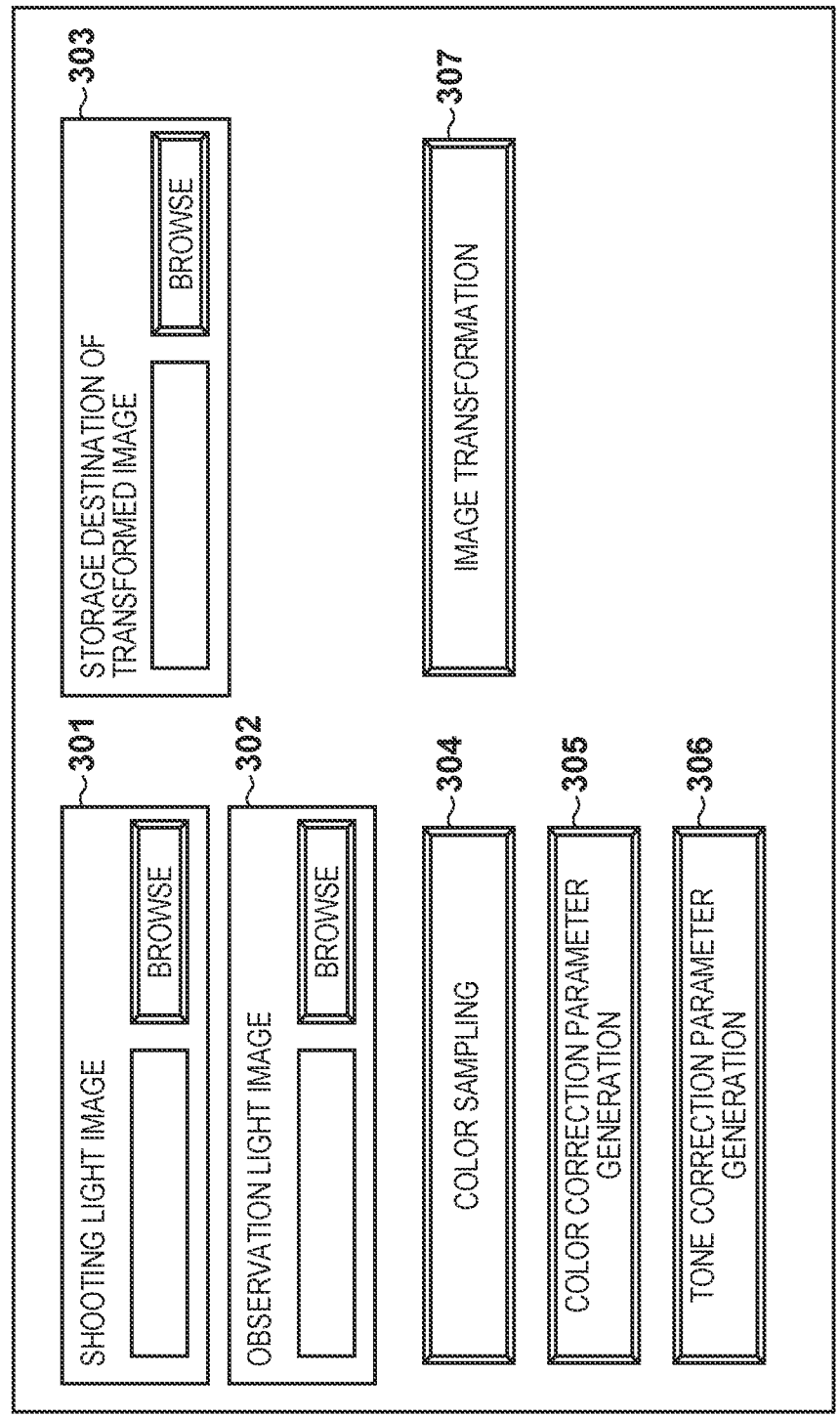
FIG. 3 is a view illustrating an example of a UI.

FIG. 3 illustrates an example of the UI. An input unit 301 serves to designate the image data of the shooting light image 1001. An input unit 302 serves to designate the image data of the observation light image 1002. An input unit 303 serves to designate the file name in storing the image data of the corrected image 1003.

A color sampling button 304 is used to instruct execution of processing of sampling colors used to generate correction conditions. A color correction parameter generation button 305 is used to instruct generation of color correction conditions (color correction parameters) which use sampled color values. A tone correction parameter generation button 306 is used to instruct generation of tone correction conditions (tone correction parameters) which use sampled color values. An image transformation button 307 is used to instruct execution of correction processing which uses color correction parameters and tone correction parameters.

When the input units 301 and 302 receive the file names of the shooting light image 1001 and observation light image 1002, the CPU 112 acquires the image data of the shooting light image 1001 and that of the observation light image 1002 from the image data storage 102 based on the received file names, and stores the acquired image data in the memory 110 (S12).

As shown in FIG. 11A, the shooting light image 1001 is captured so as to prevent the occurrence of ununiformity of light as much as possible by arranging a plurality of flashes 1011 around the subject 1021 (first light condition). Also, the observation light image 1002 is captured upon making only the light condition different from those for the shooting light image 1001. That is, as shown in FIG. 11B, upon setting the positional relationship of a subject 1021 identical to that shown in FIG. 11A with the camera 1016 to be the same as in capturing an image in FIG. 11A, and changing the illuminant to a observation light 1012 such as a fluorescent lamp or spotlight fixed at a predetermined position such as the ceiling or wall, a observation light image 1002 is captured (second light condition). Note that the first light condition need only be set so as to obtain a larger amount of light than that under the second light condition, and may be set by additionally arranging a flash 1011 to the configuration used in the second light condition. That is, in capturing an image under the first light condition shown in FIG. 11A, the observation light 1012 may or may not be used.

When the color sampling button 304 is pressed, the color sampling position acquisition unit 104 acquires color sampling positions based on a user instruction (S13), as details will be described later. The color value calculator 105 calculates color values (sampled color values) of pixels at the color sampling positions of the shooting light image 1001 and observation light image 1002 (S14), as details will be described later.

When the color correction parameter generation button 305 is pressed, the color correction condition generator 106 generates color correction parameters from the sampled color values (S15), as details will be described later. Also, when the tone correction parameter generation button 306 is pressed, the tone correction condition generator 107 generates tone correction parameters from the sampled color values (S16), as details will be described later.

When the image transformation button 307 is pressed, the image corrector 108 performs correction processing for the image data of the shooting light image 1001 using the generated color correction parameters and tone correction parameters to generate image data of the corrected image 1003 (S17), as details will be described later.

Color Sampling Position Acquisition Unit

Figure 4:
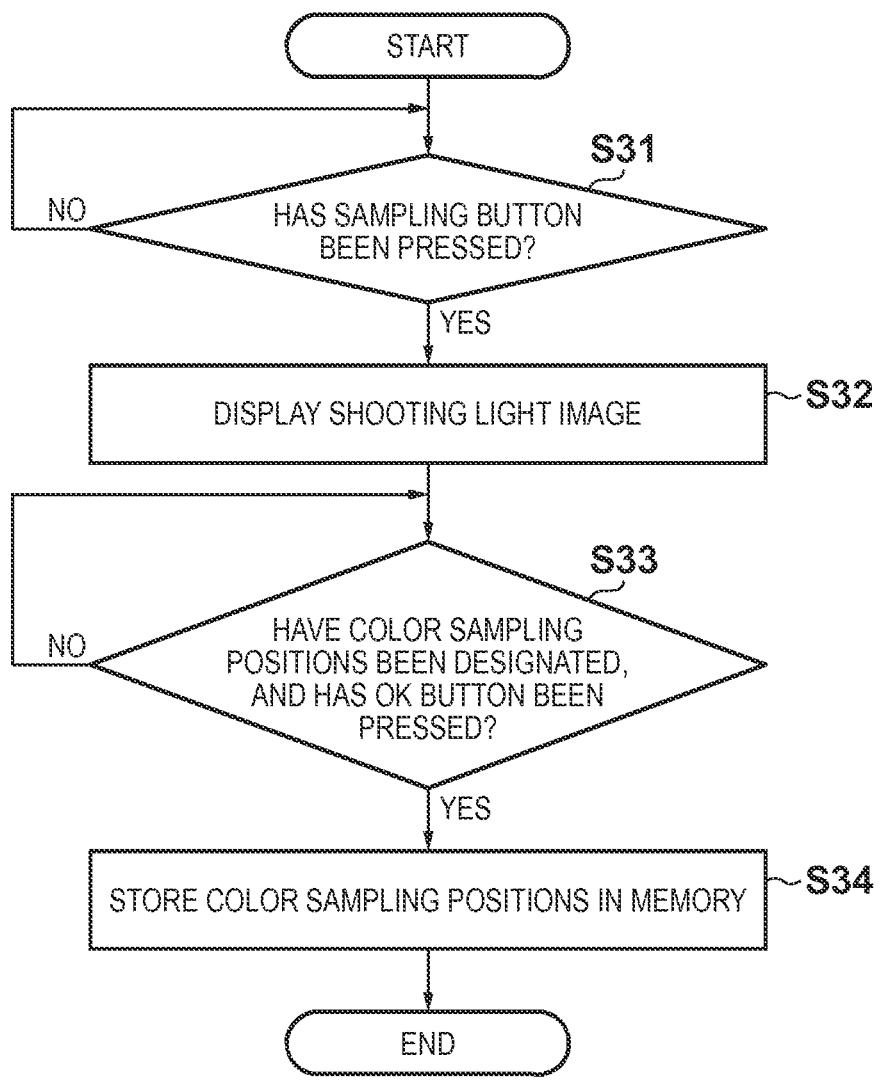
FIG. 4 is a flowchart showing processing of acquiring sampling positions.

Processing of acquiring color sampling positions (S13), which is executed by the color sampling position acquisition unit 104, will be described with reference to a flowchart shown in FIG. 4.

The color sampling position acquisition unit 104 determines whether the color sampling button 304 has been pressed (S31). If the color sampling button 304 has been pressed, the color sampling position acquisition unit 104 advances the process to step S32; otherwise, it waits in step S31.

Figure 5:
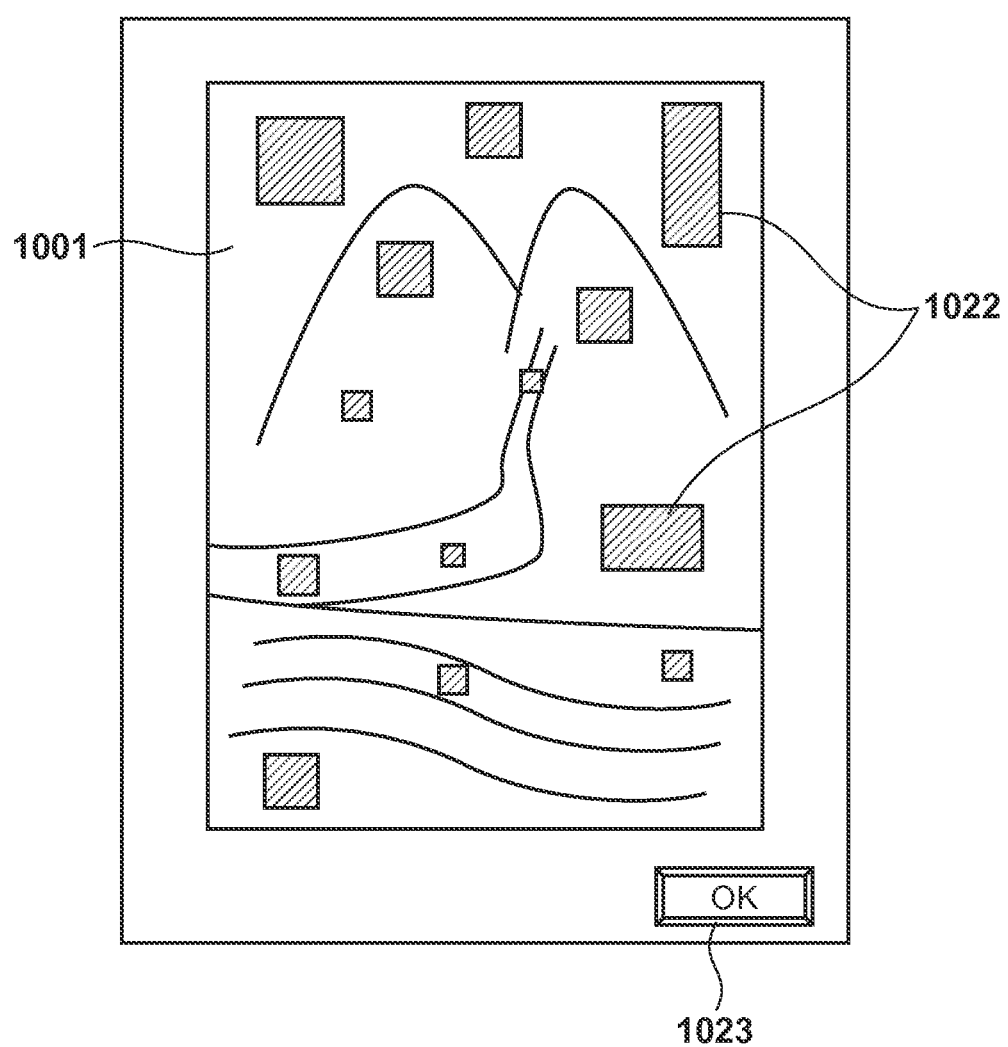
FIG. 5 is a view illustrating an example of a UI used to designate sampling positions.

When the color sampling button 304 is pressed, the color sampling position acquisition unit 104 displays, on the UI unit 109, a UI for designating color sampling positions shown in FIG. 5 (S32). The shooting light image 1001 is displayed on the UI shown in FIG. 5 to allow the user to designate a plurality of pixel positions where color sampling is to be done from the shooting light image 1001. For example, as shown in FIG. 5, the user designates a plurality of rectangular regions 1022 in the shooting light image 1001 as color sampling positions. Note that characteristic colors (representative colors or memory colors) of an original are preferably selected as the colors to be sampled.

The color sampling position acquisition unit 104 determines whether color sampling positions have been designated by the user, and an OK button 1023 has been pressed (S33). If color sampling positions have been designated, and the OK button 1023 has been pressed, the color sampling position acquisition unit 104 advances the process to step S34. If color sampling positions have not been designated, or color sampling positions have been designated but the OK button 1023 has not been pressed, the color sampling position acquisition unit 104 waits in step S33.

If color sampling positions have been designated, and the OK button 1023 has been pressed, the color sampling position acquisition unit 104 stores information indicating the color sampling positions in the memory 110 (S34), and ends the process. Note that the information indicating the color sampling positions may take any form, and is, for example, the positions (X and Y coordinates) of the upper left pixels in the rectangular regions 1022, or a set of width and length.

Color Value Calculator

Figure 6:
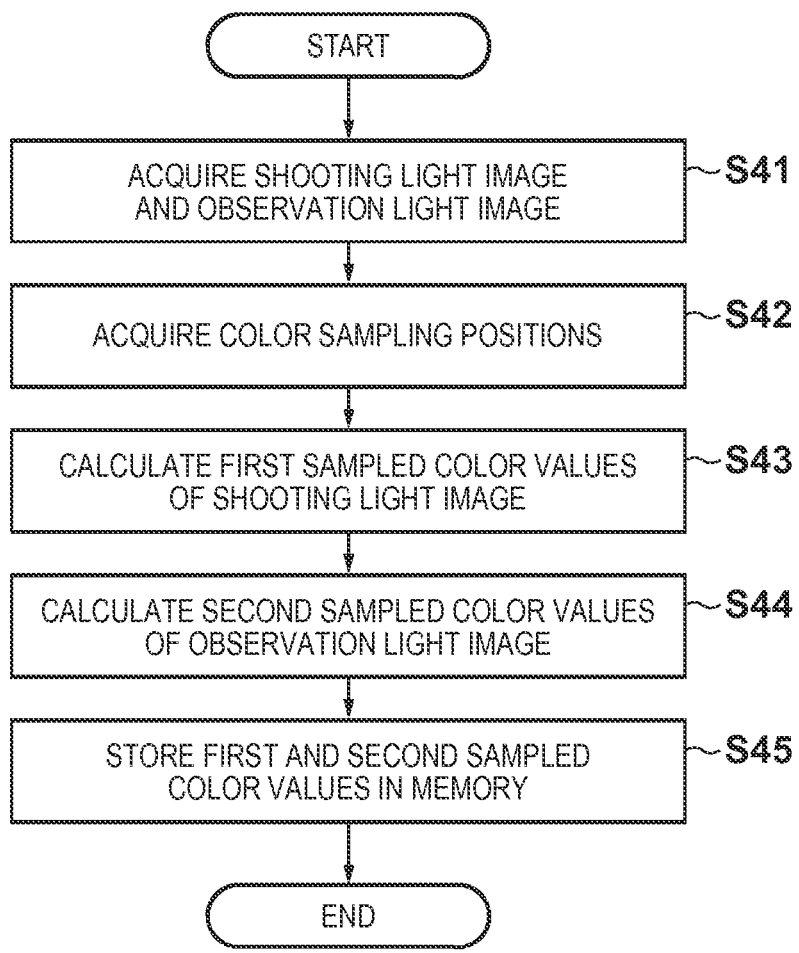
FIG. 6 is a flowchart showing color value calculation processing.

Processing of calculating color values (S14), which is executed by the color value calculator 105, will be described in detail with reference to a flowchart shown in FIG. 6.

The color value calculator 105 acquires the shooting light image 1001 and observation light image 1002 from the memory 110 (S41), and acquires color sampling positions from the memory 110 (S42).

The color value calculator 105 calculates the values (first sampled color values) of pixels at color sampling positions in the shooting light image 1001 (S43). For example, the average of the values (for example, sRGB values) of all pixels included in the corresponding rectangular region 1022 may be determined as the sampled color value of this color sampling position. Note that if cameras which capture the shooting light image 1001 and observation light image 1002 of the subject 1021 are identical or at least of the same model, the sampled color values may be the device RGB values (color signal values) of the cameras.

The color value calculator 105 calculates the values (second sampled color values) of pixels at color sampling positions in the observation light image 1002 (S44) in the same way as in step S43. The color value calculator 105 associates the calculated first and second sampled color values with each color sampling position, and stores them in the memory 110 (S45), and ends the process.

Color Correction Condition Generator

Figure 7:
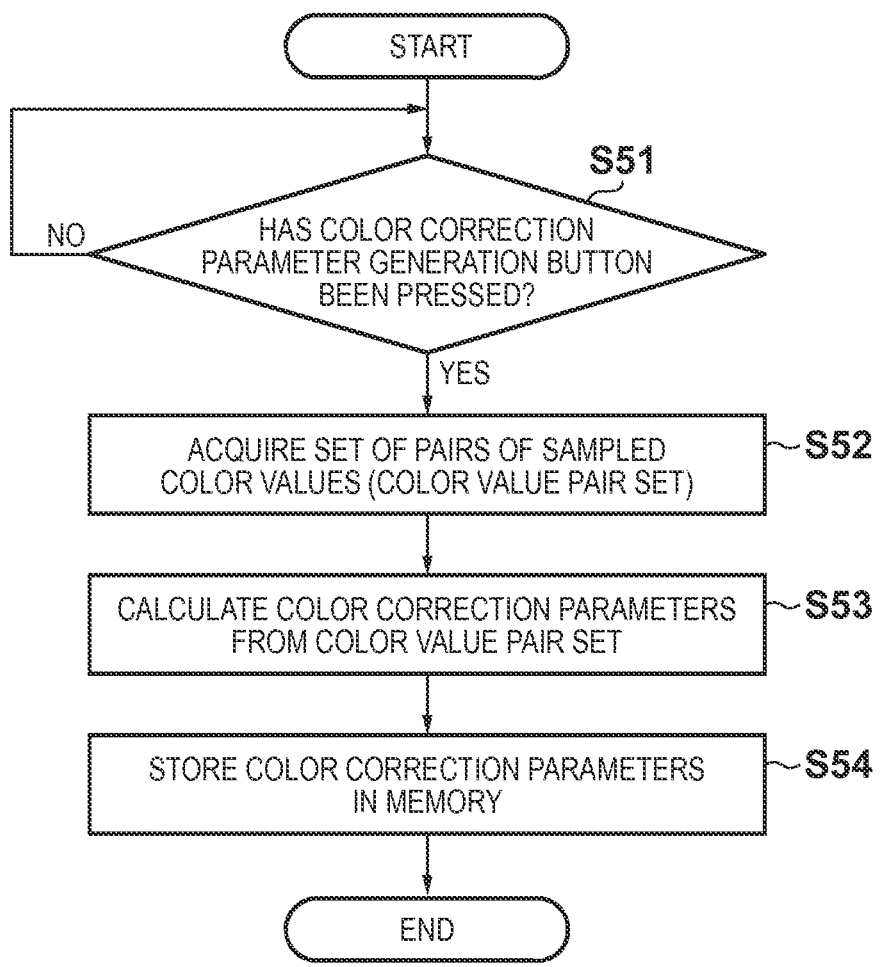
FIG. 7 is a flowchart showing color correction parameter generation processing.

Processing of generating color correction parameters (S15), which is executed by the color correction condition generator 106, will be described in detail with reference to a flowchart shown in FIG. 7.

The color correction condition generator 106 determines whether the color correction parameter generation button 305 has been pressed (S51). If the color correction parameter generation button 305 has been pressed, the color correction condition generator 106 advances the process to step S52; otherwise, it waits in step S51.

When the color correction parameter generation button 305 is pressed, the color correction condition generator 106 acquires a set of pairs of first sampled color values and corresponding second sampled color values (to be referred to as a "color value pair set" hereinafter) from the memory 110 (S52), and calculates color correction parameters from the color value pair set (S53). The color correction parameters are used to transform the colors of the shooting light image 1001 into those that depend on the observation light 1012, and, in this embodiment, are represented as a 3×9 matrix given by:

$$\begin{pmatrix} a_{11} & a_{12} & \ldots & a_{19} \\ a_{21} & a_{22} & \ldots & a_{29} \\ a_{31} & a_{32} & \ldots & a_{39} \end{pmatrix} \quad (1)$$

More specifically, each coefficient of the matrix is calculated using, for example, the least-squares method based on the color value pair set. Note that since the least-squares method is known, a description thereof will not be given.

The color correction condition generator 106 stores the calculated color correction parameters in the memory 110 (S54), and ends the process.

Tone Correction Condition Generator

Figure 8:
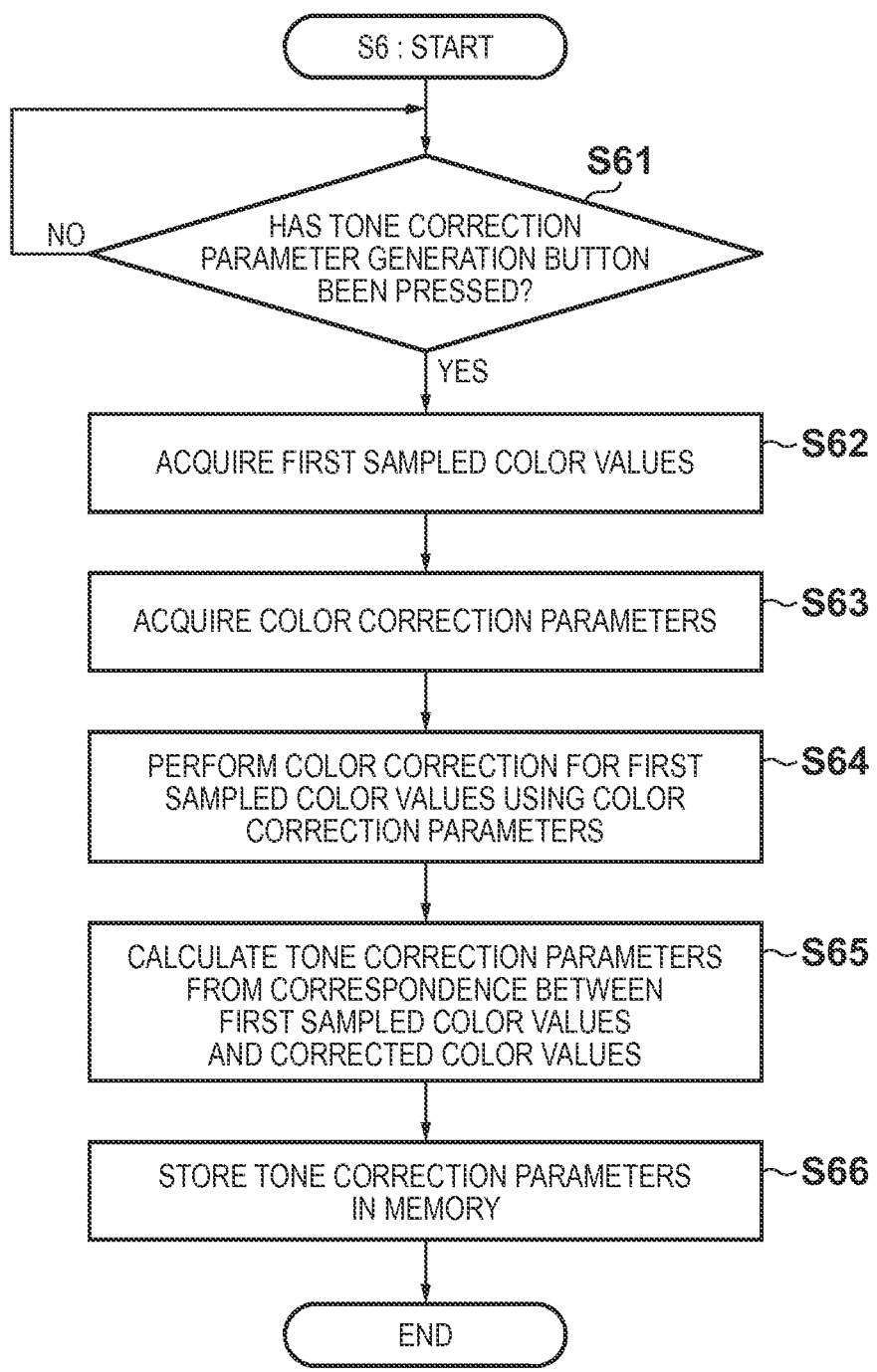
FIG. 8 is a flowchart showing tone correction parameter generation processing.

Tone correction parameter generation processing (S16) executed by the tone correction condition generator 107 will be described in detail with reference to a flowchart shown in FIG. 8.

The tone correction condition generator 107 determines whether the tone correction parameter generation button 306 has been pressed (S61). If the tone correction parameter generation button 306 has been pressed, the tone correction condition generator 107 advances the process to step S62; otherwise, it waits in step S61.

When the tone correction parameter generation button 306 is pressed, the tone correction condition generator 107 acquires first sampled color values from the memory 110 (S62), and acquires the color correction parameters, calculated in step S15, from the memory 110 (S63). Color correction is performed for the first sampled color values using the color correction parameters (Expression (1)) (S64) as per:

$$\begin{pmatrix} R' \\ G' \\ B' \end{pmatrix} = \begin{pmatrix} a_{11} & a_{12} & \ldots & a_{19} \\ a_{21} & a_{22} & \ldots & a_{29} \\ a_{31} & a_{32} & \ldots & a_{39} \end{pmatrix} \begin{pmatrix} R_1 \\ G_1 \\ B_1 \end{pmatrix} \quad (2)$$

where $R_1$, $G_1$, and $B_1$ are first sampled color values, and R', G', and B' are color values after color correction.

The tone correction condition generator 107 calculates tone correction parameters based on the association between the first sampled color values, and the color values (to be referred to as the "corrected color values" hereinafter) obtained by color correction in accordance with expression (2) (S65). The tone correction parameters are used to transform a luminance value $L^*$ of the shooting light image 1001 into a luminance value $L^{*\prime}$ which depends on the observation light 1012, and are coefficients for a quadratic function in this embodiment. A method of calculating tone correction parameters will be described in detail below.

First, the first sampled color values and corrected color values are transformed into CIE tristimulus values X, Y, and Z using:

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R \\ G \\ B \end{pmatrix} \quad (3)$$

and are further transformed into CIELAB values using:

if (Y/Yn) > 0.008856 {
    $L^* = 116(Y/Yn)^{1/3} - 16$;

$a^* = 500[(X/Xn)^{1/3} - (Y/Yn)^{1/3}]$;
    $b^* = 200[(Y/Yn)^{1/3} - (Z/Zn)^{1/3}]$;
} else {
    $L^* = 903.29(Y/Yn)$;
    $a^* = 500[(7.78(X/Xn)+16/116) - (7.78(Y/Yn)+16/116)]$;
    $b^* = 200[(7.78(Y/Yn)+16/116) - (7.78(Z/Zn)+16/116)]$;
}     ...(4)

where Xn, Yn, and Zn are the XYZ values of a white point (Xn=95.05, Yn=100.0, and Zn=108.91 for a D65 illuminant).

Coefficients a, b, and c of the respective terms of a quadratic function given by:

$$L^{*\prime} = a \times L^{*2} + b \times L^* + c \quad (5)$$

are calculated as tone correction parameters using, for example, the least-squares method from a set of pairs of the luminance values $L^*$ of the first sampled color values and the luminance values $L^{*\prime}$ of the corrected color values. That is, expression (5) is used to transform the luminance values $L^*$ of the first sampled color values into the luminance values $L^{*\prime}$ of the corresponding corrected color values.

The tone correction condition generator 107 stores the tone correction parameters in the memory 110 (S66), and ends the process.

Image Corrector

Figure 9:
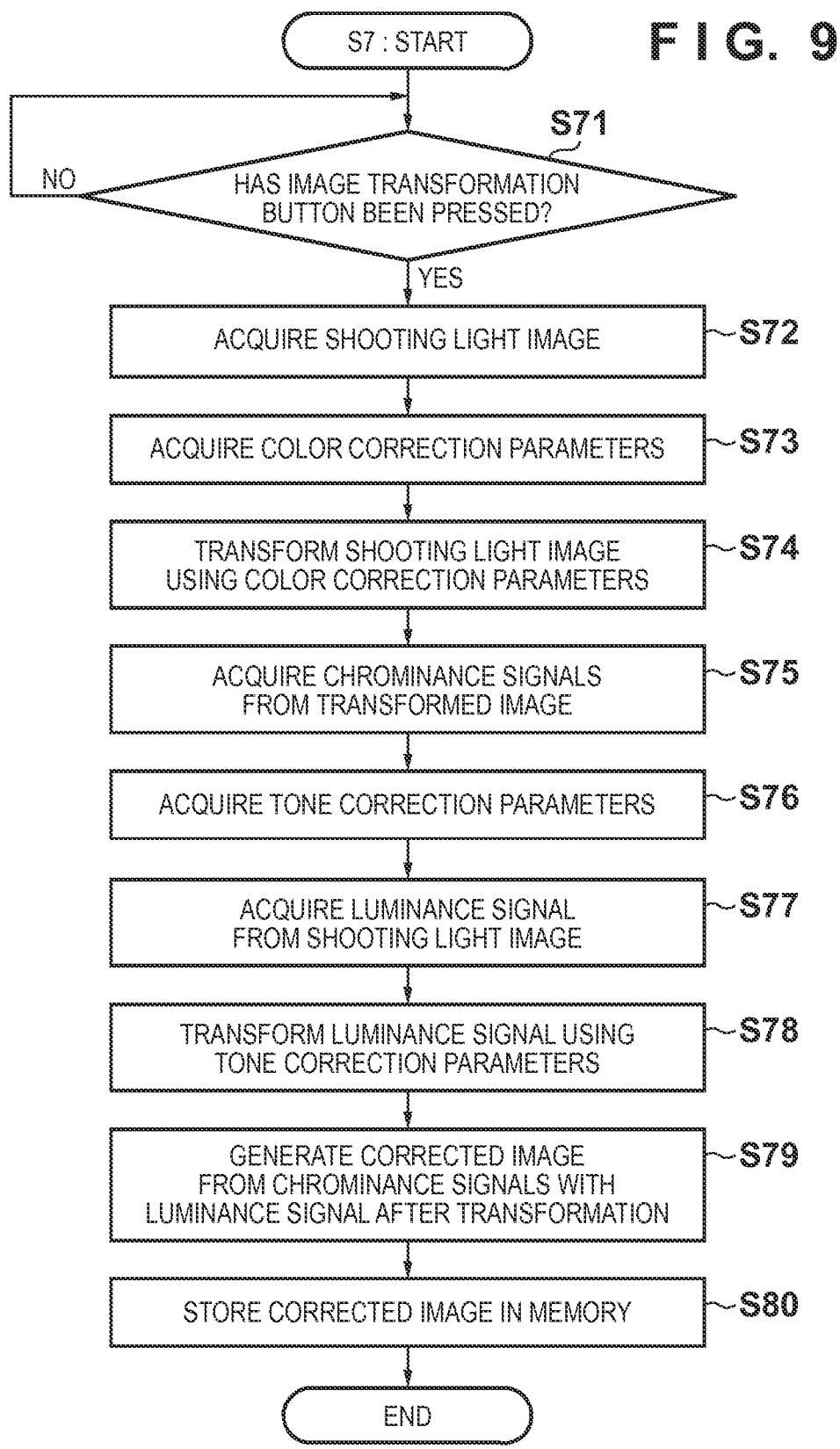
FIG. 9 is a flowchart showing image correction processing.

Processing (S17) executed by the image corrector 108 will be described in detail with reference to a flowchart shown in FIG. 9.

The image corrector 108 determines whether the image transformation button 307 has been pressed (S71). If the image transformation button 307 has been pressed, the image corrector 108 advances the process to step S72; otherwise, it waits in step S71.

When the image transformation button 307 is pressed, the image corrector 108 acquires image data of the shooting light image 1001 from the memory 110 (S72), acquires color correction parameters from the memory 110 (S73), and performs color correction for the image data of the shooting light image 1001 using the color correction parameters and expression (2) (S74).

The image corrector 108 transforms the transformed image data into CIELAB values using expressions (3) and (4) to acquire a*b* values indicating chrominance signals (S75).

The image corrector 108 acquires tone correction parameters from the memory 110 (S76), and transforms the image data of the shooting light image 1001 into CIELAB values using expressions (3) and (4) to acquire a luminance signal $L^*$ (S77). The tone correction parameters are applied to the luminance signal $L^*$ to acquire a luminance signal $L^{*\prime}$ after tone correction (S78). That is, $L^*$ values are substituted into expression (5), and transformation corresponding to the tone correction parameters a, b, and c is performed to acquire $L^{*\prime}$ values after tone correction.

The image corrector 108 calculates image data of the corrected image 1003 based on the chrominance signals a*b* and luminance signal $L^{*\prime}$ (S79). Note that transformation from CIELAB values into sRGB values is done in accordance with:

f(Y) = ($L^{*\prime}$ +16)/116;
f(X) = a*/500 + f(Y);
f(Z) = -b*/200 + f(Y);
if (f(X)$^3$ > 0.008856) {

$$\begin{aligned} &X = Xn \times f(X)^3; \\ &Y = Yn \times f(Y)^3; \\ &Z = Zn \times f(Z)^3; \\ &\} \text{ else } \{ \\ &X = [f(X) - 16/116] \times Xn/7.787; \\ &Y = [f(Y) - 16/116] \times Yn/7.787; \\ &Z = [f(Z) - 16/116] \times Zn/7.787; \\ &\} \end{aligned} \quad \ldots(6)$$

where Xn, Yn, and Zn are the XYZ values of a white point (Xn=96.43, Yn=100.0, and Zn=82.51 for a D50 illuminant).

$$\begin{pmatrix} R \\ G \\ B \end{pmatrix} = \begin{pmatrix} -0.2406 & -1.5372 & -0.4986 \\ -0.9689 & 1.8758 & 0.0415 \\ 0.0557 & -0.2040 & 1.0570 \end{pmatrix} \begin{pmatrix} X \\ Y \\ Z \end{pmatrix} \quad (7)$$

The above-mentioned transformation processing is performed for all pixels in the shooting light image 1001 to generate image data (corrected image 1003) after light-source conversion processing.

The image corrector 108 stores the generated image data of the corrected image 1003 in the memory 110 (S80), and ends the process.

With this arrangement, under conditions in which different illuminants are used in capturing an image, color correction parameters and tone correction parameters are generated from a shooting light image and observation light image obtained by capturing images of a common subject. Correction processing which uses these correction parameters makes it possible to transform image data which depends on a shooting light into that which depends on a observation light with high accuracy.

Second Embodiment

The second embodiment according to the present invention will be described below. An example in which color correction conditions and tone correction conditions are generated from a shooting light image and an observation light image, and image data which depends on the shooting light is transformed into that which depends on the observation light by correction using these correction conditions has been given in the above-mentioned first embodiment. However, because a considerable ununiformity of light occurs in a shooting light image and an observation light image in the first embodiment due to factors associated with illumination in capturing an image, the accuracy of each calculated correction condition, that is, the light source conversion accuracy has a limit. Accordingly, an example in which correction is performed to suppress ununiformity of light in a shooting light image and an observation light image to perform light source conversion with high accuracy will be given in the second embodiment.

Configuration of Image Processing Apparatus

Figure 12:
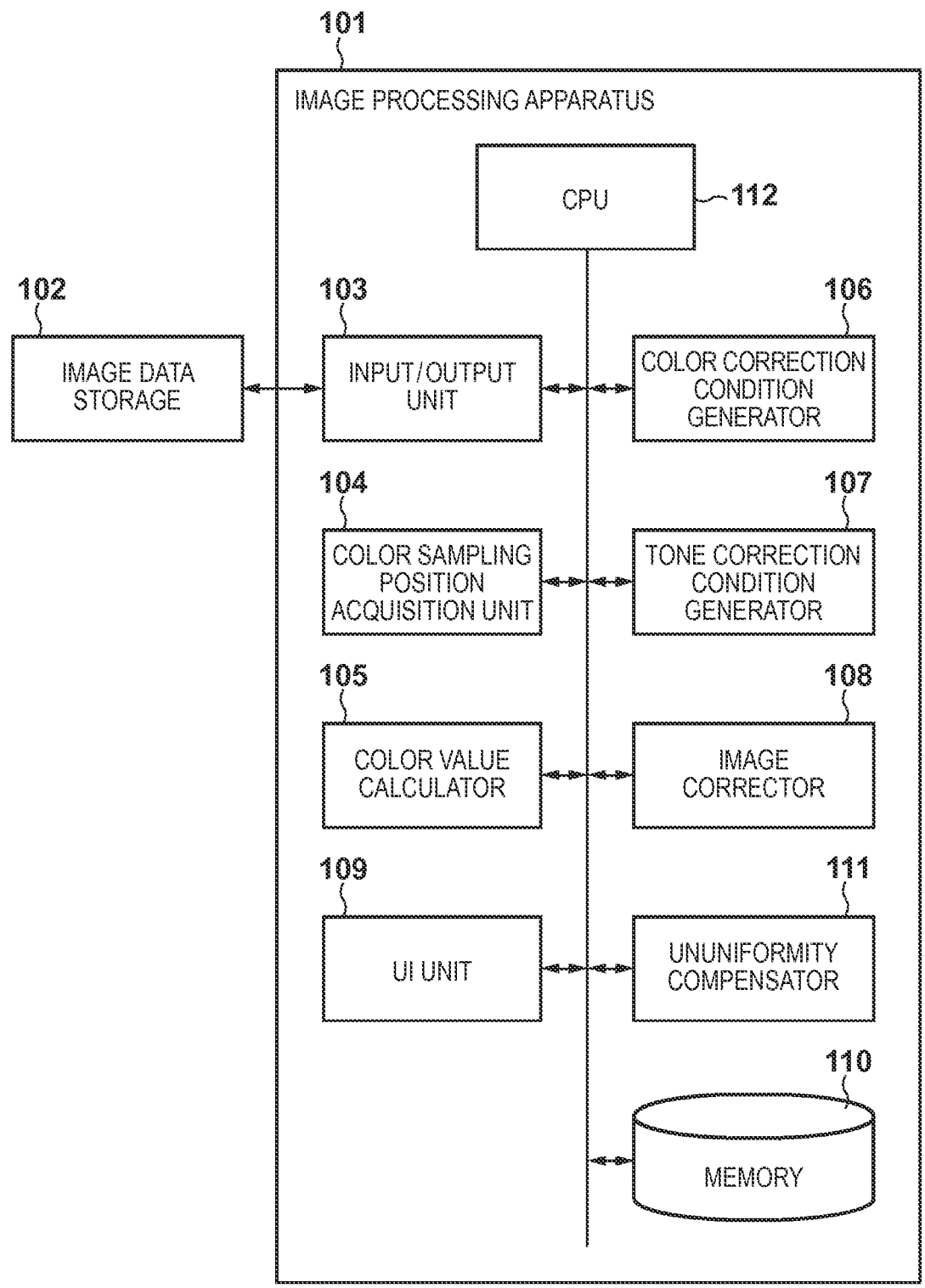
FIG. 12 is a block diagram showing the configuration of an image processing apparatus in the second embodiment.

FIG. 12 is a block diagram showing the configuration of an image processing apparatus 101 in the second embodiment. The image processing apparatus 101 in the second embodiment is different from that in the first embodiment in that in the former an ununiformity compensator 111 is added to the configuration. Other components and operations in the second embodiment are the same as in the first embodiment, and a description thereof will not be given.

Ununiformity Compensator

Figure 13:
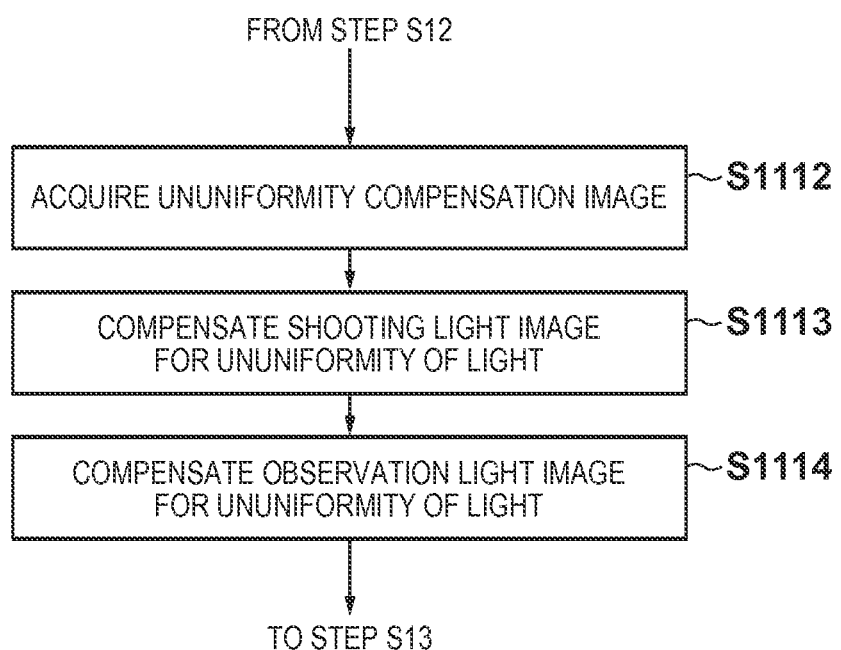
FIG. 13 is a flowchart showing ununiformity correction processing in the second embodiment.

Ununiformity correction processing in the second embodiment will be described below with reference to a flowchart shown in FIG. 13. Note that ununiformity correction processing is executed in the interval between steps S12 and S13 in the light-source conversion processing shown in FIG. 2. That is, ununiformity correction is performed for a shooting light image 1001 and observation light image 1002 acquired in step S12, and processes in step S3 and subsequent steps are performed for the image after ununiformity correction to finally generate image data of a corrected image 1003 after light-source conversion processing.

A CPU 112 acquires the shooting light image 1001 and observation light image 1002 (S12), and then acquires a ununiformity compensation image from an image data storage 102 (S1112).

The ununiformity compensation image means an image obtained by capturing a uniform chart (for example, a white uniform plate) larger in size than a subject 1021 under the same image capturing conditions as in capturing an image of the subject 1021 under a flash 1011 and a observation light 1012. The ununiformity compensation image includes a first ununiformity compensation image which is captured under the flash 1011, is associated with the shooting light image 1001, and has the same size as that of the shooting light image 1001, and a second ununiformity compensation image which is captured under the observation light 1012, is associated with the observation light image 1002, and has the same size as that of the observation light image 1002. The CPU 112 acquires a ununiformity compensation image in accordance with this association.

The ununiformity compensator 111 performs ununiformity correction processing for the image data of the shooting light image 1001 using the image data of the first ununiformity compensation image (S1113). This ununiformity correction processing will be described in detail below.

The ununiformity compensator 111 calculates an ununiformity correction reference value required to calculate ununiformity correction coefficients. For example, the averages of the pixel values of the entire ununiformity compensation image are represented as Rave, Gave, and Bave, which are defined as ununiformity correction reference values. Note that the statistic values used to calculate ununiformity correction reference values are not limited to the averages of the pixel values of the entire ununiformity compensation image, and other statistic values such as the maximum values, median values, and modal values may be used.

The ununiformity compensator 111 calculates ununiformity correction coefficients from the ununiformity compensation image and ununiformity correction reference values using:

$$Rk(x,y) = \text{Rave}/\text{Rchart}(x,y);$$

$$Gk(x,y) = \text{Gave}/\text{Gchart}(x,y);$$

$$Bk(x,y) = \text{Bave}/\text{Bchart}(x,y); \quad (8)$$

where Rk(x, y) is an ununiformity correction coefficient for an R component at the coordinates (x, y), Gk(x, y) is an ununiformity correction coefficient for a G component at the coordinates (x, y), Bk(x, y) is an ununiformity correction coefficient for a B component at the coordinates (x, y), Rchart (x, y) is the R value at the coordinates (x, y) in the ununiformity compensation image, Gchart(x, y) is the G value at the coordinates (x, y) in the ununiformity compensation image, and Bchart(x, y) is the B value at the coordinates (x, y) in the ununiformity compensation image.

The ununiformity compensator 111 performs ununiformity correction of the shooting light image 1001 in accordance with:

$$R'(x,y) = Rk(x,y) \times R(x,y);$$

$$G'(x,y) = Gk(x,y) \times G(x,y);$$

$$B'(x,y) = Bk(x,y) \times B(x,y); \quad (9)$$

and stores the compensated shooting light image 1001 in a memory 110,
where R(x, y), G(x, y), and B(x, y) are the RGB values at the coordinates (x, y) in the shooting light image 1001 before compensation, and R'(x, y), G'(x, y), and B'(x, y) are the RGB values at the coordinates (x, y) in the shooting light image 1001 after compensation.

When the ununiformity correction processing for the shooting light image 1001 ends, the ununiformity compensator 111 performs ununiformity correction processing for the image data of the observation light image 1002 using the image data of the second ununiformity compensation image (S1114). This ununiformity correction processing is the same as in step S1113, except that image data to be compensated, and image data used in compensation processing are different. Also, the shooting light image 1001 and observation light image 1002 after ununiformity correction processing are stored in the memory 110.

With this arrangement, light-source conversion processing is executed, as in the first embodiment, after ununiformity of light that occurs in each of a shooting light image and observation light image is compensated. This makes it possible to transform image data which depends on a shooting light into that which depends on an observation light with higher accuracy.

Modification of Embodiments

Although an example in which a color space represented by CIELAB values is used in generating color correction conditions and tone correction conditions, and performing compensation processing has been given in each of the above-mentioned embodiments, other color spaces represented by, for example, CIECAM02 may be used.

Also, although a configuration which displays a UI to allow the user to designate a color sampling region in sampling representative colors from a shooting light image and observation light image has been described in each embodiment, the images may be analyzed to automatically sample representative colors or memory colors.

Moreover, although the color correction parameters are represented as 3×9 matrix coefficients in the above description, the present invention is not limited to this example, and 3×3 or 3×20 matrix coefficients, for example, may be used. However, the color correction parameters need not always be represented as matrix coefficients, and may be represented as, for example, a one- or three-dimensional lookup table (LUT). In this case, pixel values that are not described in the LUT are transformed by linear or nonlinear interpolation.

Again, although the tone correction parameters are represented as coefficients for a quadratic function in each embodiment, they may be represented as coefficients for a cubic or quartic function. Also, although an example in which the tone correction parameters are transformed by a polynomial function has been given in each embodiment, tone correction may be done using another function such as a spline curve or a Bezier curve.

Again, although an example in which ununiformity correction coefficients are calculated from the pixel values of an ununiformity compensation image has been given in the second embodiment, the pixel values may be transformed into XYZ values using a transformation equation such as sRGB or AdobeRGB to calculate compensation coefficients from the XYZ values. When ununiformity correction coefficients calculated using XYZ values in this way are applied to an image of a subject, the pixel values of the image of the subject are transformed into XYZ values, ununiformity correction coefficients are applied, and the XYZ values after application are transformed into RGB pixel values.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-182640 filed Aug. 21, 2012, which is hereby incorporated by reference herein in its entirety.

What is claimed is:

1. An image processing apparatus comprising:
an input unit configured to input first image data obtained by capturing an image of a subject under a first light condition, and second image data obtained by capturing an image of the subject under a second light condition different from the first light condition;
an acquisition unit configured to acquire sampling positions of colors used to generate correction parameters;
a sampling unit configured to sample first color signal values from the sampling positions in the first image data, and to sample second color signal values from the sampling positions in the second image data; and
a generation unit configured to generate correction parameters, used to correct the first image data which depends on the first light condition into image data which depends on the second light condition, based on the first color signal values and the second color signal values,
wherein the generation unit comprises:
a first generator configured to generate color correction parameters used to transform the first color signal values into the second color signal values; and
a second generator configured to calculate a first luminance value from the first color signal values, to calculate a second luminance value from a correction value obtained by correcting the first color signal values using the color correction parameters, and to calculate tone correction parameters used to transform the first luminance value into the second luminance value, and
wherein at least one of the input unit, the acquisition unit, the sampling unit, or the generation unit is implemented at least in part by hardware components of the image processing apparatus.

2. The apparatus according to claim 1, further comprising a correction unit configured to correct the first image data into image data which depends on the second light condition by correction processing using the color correction parameters.

3. The apparatus according to claim 2, wherein the correction unit comprises:
a first corrector configured to perform correction processing for the first image data using the color correction parameters, and to acquire a chrominance signal from the image data after the correction processing;
a second corrector configured to acquire a luminance signal from the first image data, and to perform correction processing for the luminance signal using the tone correction parameters; and
a third generator configured to generate image data which depends on the second light condition, from the chrominance signal, and the luminance signal after the correction processing.

4. The apparatus according to claim 1, wherein an amount of light defined by the first light condition is larger than an amount of light defined by the second light condition.

5. The apparatus according to claim 1, wherein the first light condition includes flash emission in capturing an image represented by the first image data, and the second light condition corresponds to observation light of the subject.

6. The apparatus according to claim 1, wherein the acquisition unit provides a user interface configured to allow a user to designate the sampling positions in an image represented by the first image data.

7. The apparatus according to claim 1, further comprising a compensation unit configured to correct each of the first image data and the second image data for luminance ununiformity due to factors associated with illumination.

8. The apparatus according to claim 7, wherein the compensation unit executes correction of the luminance ununiformity before processing operations of the acquisition unit, the sampling unit, and the generation unit.

9. The apparatus according to claim 7, wherein the compensation unit performs the steps of:
inputting first compensation image data obtained by capturing an image of a white plate larger than the subject under an image capturing condition identical to an image capturing condition under which the first image data is obtained;
inputting second compensation image data obtained by capturing an image of the white plate under the image capturing condition identical to the image capturing condition under which the second image data is obtained;
compensating the first image data using a ratio, between an average of color signal values and a color signal value of each pixel, of the first compensation image data; and
compensating the second image data using a ratio, between an average of color signal values and a color signal value of each pixel, of the second compensation image data.

10. An image processing method comprising:
using a processor to perform steps of:
inputting first image data obtained by capturing an image of a subject under a first light condition;
inputting second image data obtained by capturing an image of the subject under a second light condition different from the first light condition;
acquiring sampling positions of colors used to generate correction parameters;
sampling first color signal values from the sampling positions in the first image data;
sampling second color signal values from the sampling positions in the second image data; and
generating correction parameters, used to correct the first image data which depends on the first light condition into image data which depends on the second light condition, based on the first color signal values and the second color signal values,
wherein the generating step comprises steps of:
generating color correction parameters used to transform the first color signal values into the second color signal values;
calculating a first luminance value from the first color signal values, to calculate a second luminance value from a correction value obtained by correcting the first color signal values using the color correction parameters; and
calculating tone correction parameters used to transform the first luminance value into the second luminance value.

11. A non-transitory computer readable medium storing a computer-executable program for causing a computer to perform the image processing method according to claim 10.

* * * * *